United States Patent [19]

Schrum, III

[11] Patent Number: 4,903,978
[45] Date of Patent: Feb. 27, 1990

[54] SELF ALIGNING TRAILER HITCH

[76] Inventor: Peter N. Schrum, III, 11751 69th Way N., Largo, Fla. 34643

[21] Appl. No.: 365,971

[22] Filed: Jun. 14, 1989

[51] Int. Cl.[4] .............................................. B60D 1/06
[52] U.S. Cl. .................................... 280/477; 280/507; 280/511
[58] Field of Search ............... 280/477, 504, 508, 511, 280/507

[56] References Cited

U.S. PATENT DOCUMENTS

| | | | |
|---|---|---|---|
| 3,698,739 | 10/1972 | Szymanski et al. | 280/478 B |
| 4,560,184 | 12/1985 | Williams, Jr. | 280/478 B |
| 4,606,549 | 8/1986 | Williams, Jr. | 280/478 B |
| 4,613,149 | 9/1986 | Williams, Jr. | 280/508 |
| 4,657,275 | 4/1987 | Carroll | 280/477 |

Primary Examiner—Charles A. Marmor
Assistant Examiner—Alan M. Kagen
Attorney, Agent, or Firm—Herbert W. Larson

[57] ABSTRACT

A towing vehicle hitch assembly is pivotally mounted on a back plate and support element welded to a hitch bracket attached to the towing vehicle. The hitch assembly has a release arm maintaining a bottom plate with side guide plates integral thereto in an inclined position over a ball mounted on a post to the support element. There are a pair of pivoting release plates centered in the bottom plate. A corresponding hitch roller assembly is mounted to the tongue of a trailer with a ball socket at its distal end. The roller assembly has either ball bearings or rollers attached to its forward end. As the towing vehicle moves toward the trailer, the trailer's hitch assembly trips the release arm and stops at the forward edge of the towing vehicle hitch assembly. This places the socket above the ball and as it engages it falls by gravity over the ball.

7 Claims, 5 Drawing Sheets

SELF ALIGNING TRAILER HITCH

BACKGROUND OF THE INVENTION

1. Field of the Invention

This invention relates to trailer hitches attached; to a motorized vehicle. More particularly, it refers to a self aligning trailer hitch adapted to engage a ball mounted on a post attached to a motor vehicle.

2. DESCRIPTION OF THE PRIOR ART

Recreational trailers are most commonly mounted to a towing vehicle by attaching a ball socket at the end of a trailer tongue to a ball about 1 ½ to 2 5/16 inches in diameter mounted to the rear frame of the towing vehicle. The most bothersome problem in coupling the trailer to the towing vehicle is aligning the ball socket over the ball and dropping the socket over the ball. Various techniques have been set forth for achieving this alignment as seen in U.S. Pat. Nos. 3,698,739; 4,560,184; 4,606,549 and 4,613,149. Although these techniques provide means for aligning the trailer socket and ball, their assembly is either too expensive to construct or too complicated to operate. An improved assembly is needed.

SUMMARY OF THE INVENTION

I have invented a self aligning hitch for engagement with a ball mounted post attached to a motor vehicle. The hitch assembly has a first unit attached to a hitch bracket extending from the rear of a towing vehicle and a compatible second unit attached to the distal end of a trailer tongue.

The first unit has a back plate vertically mounted on the hitch bracket forward of a standard trailer ball mounted on a post which is bolted to the hitch bracket. A release arm is pivotally attached at a first end to the back plate. A second end of the release arm, supports right and left inwardly directed guide plates integral with a base plate in an inclined position. The second end of the release arm is tripped by the front edge of the second hitch assembly unit attached to the trailer tongue.

A pair of pivoting release doors are located in the center of the first unit's base plate. When the base plate is tripped, it falls by gravity and the release doors open upon impact with the top of the trailer ball. The base plate comes to rest in a substantially parallel plane with the top surface of the hitch bracket.

The second hitch assembly unit located on the trailer tongue has a set of ball bearing or rollers mounted on a forward end. Movement of the second hitch assembly is controlled by the right and left guide plates as it moves over the base plate of the first unit. After the forward end of the second hitch assembly trips the release arm, it falls by gravity onto the base plate of the first unit and a socket mounted within the second hitch assembly engages the trailer ball to complete the hitch.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
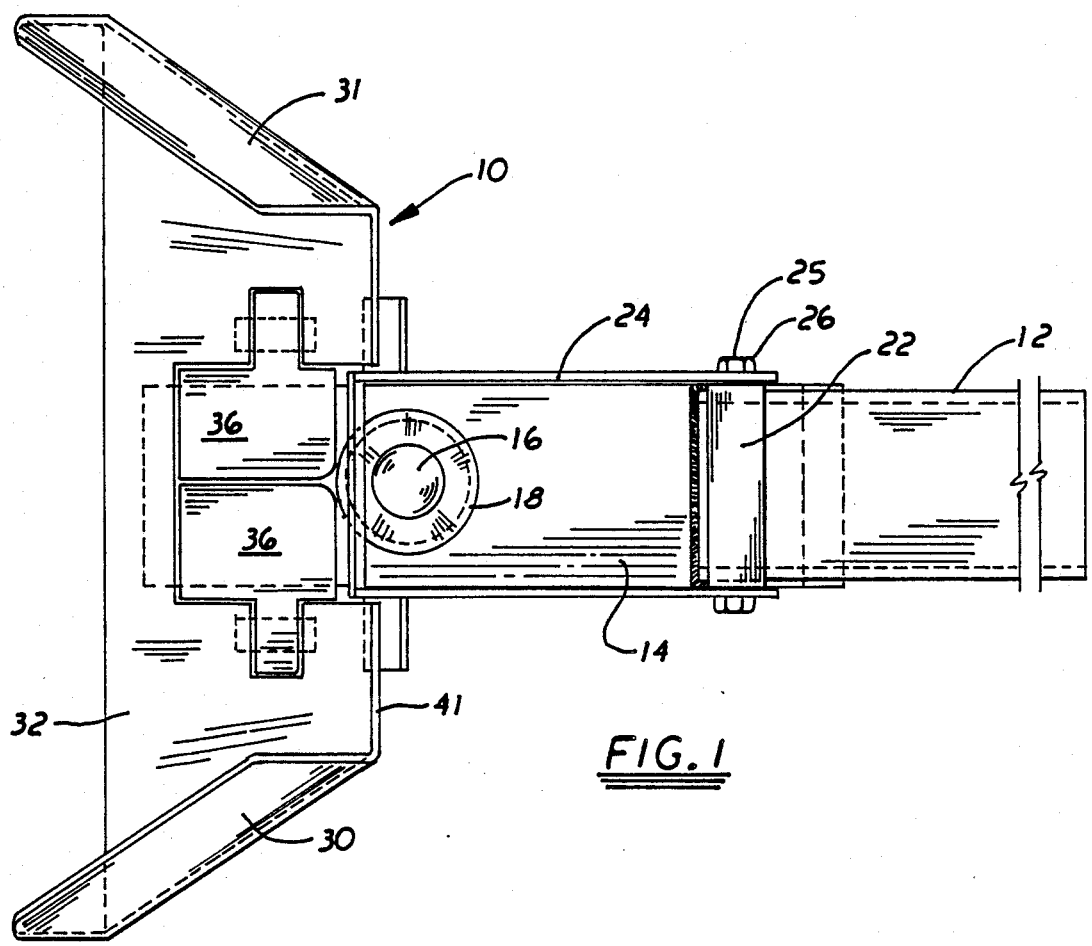
FIG. 1 is a top plan view of the motor vehicle portion of the trailer hitch prior to engagement with a trailer attachment.

Throughout the following detailed description, the same reference numerals refer to the same elements in all figures.

Figure 2:
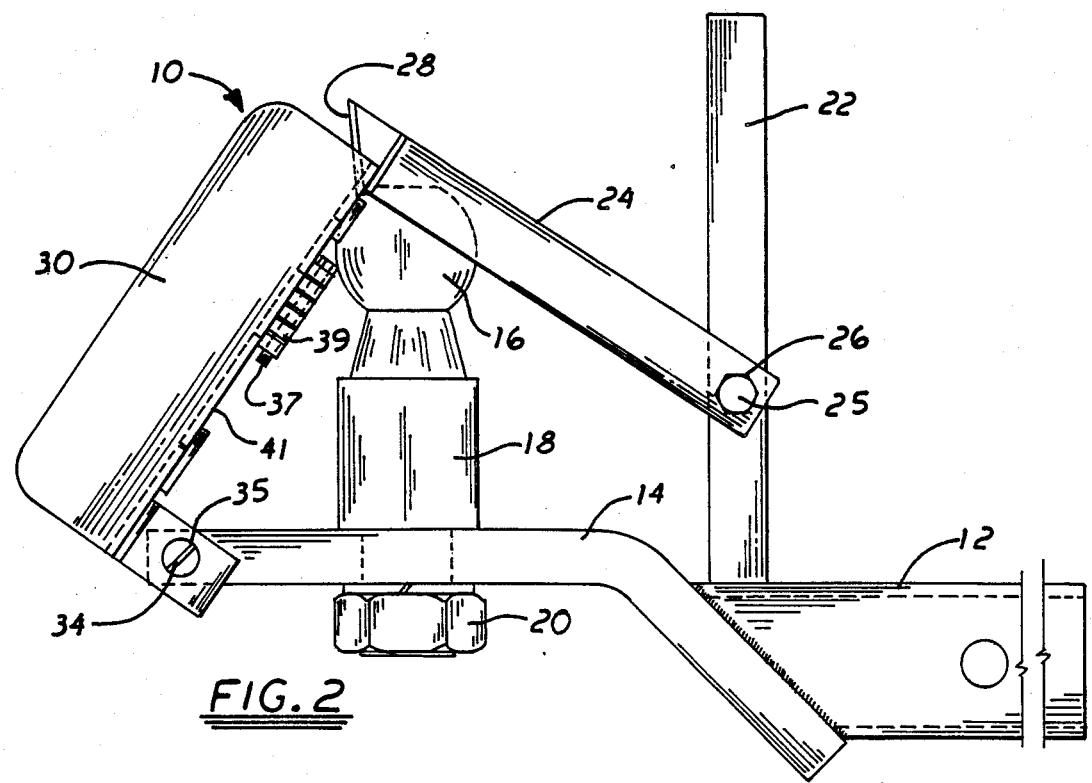
FIG. 2 is a side elevation view of the motor vehicle portion of the trailer hitch prior to engagement with a trailer attachment.
Figure 3:
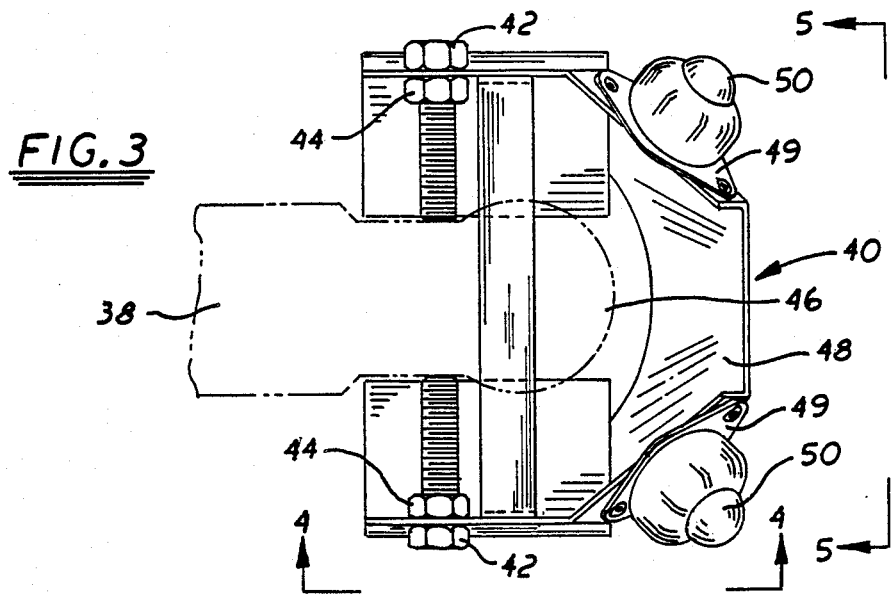
FIG. 3 is a top plan view of the trailer attachment prior to engagement with the vehicle portion of the hitch.
Figure 4:
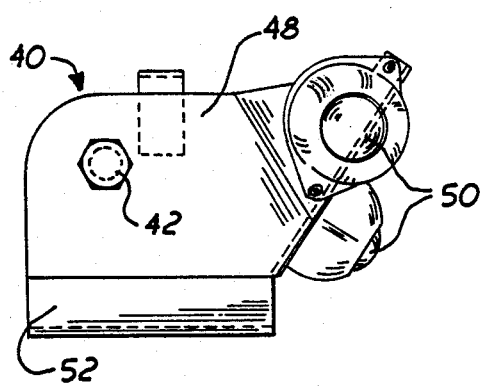
FIG. 4 is a right side elevation view of the trailer attachment along lines 4—4 of FIG. 3.
Figure 5:
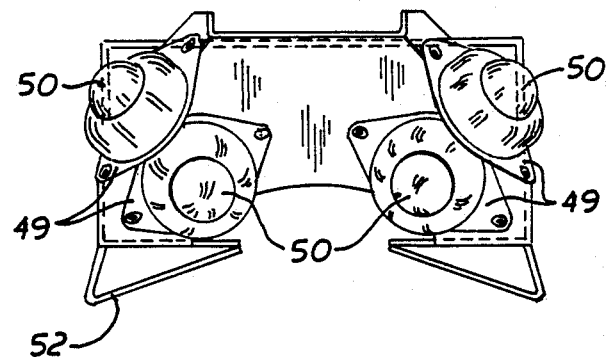
FIG. 5 is a front elevation view of the trailer attachment along lines 5—5 of FIG. 3.

FIGS. 1 and 2 show a towing vehicle first hitch assembly 10 and FIGS. 3, 4 and 5 show a towed trailer second hitch assembly 40.

The towing vehicle first assembly 10 employs a hitch bracket 12 welded or bolted to the frame of the towing vehicle. The hitch bracket 12 is welded to a rearwardly extending support element 14 supporting the ball 16 on its post 18. The post 18 is bolted with nut 20 to the support element 14. A back plate or post 22 is mounted by welding on the hitch bracket 12 in an upright position. A release arm 24 is rotatably mounted at a first end with a bolt 25 on the back plate 22 at pivot point 26. The release arm 24 has at its second end an inclined surface 28. This surface is distal from the back plate 22.

Right and left guide plates 30 and 31 respectively, are integral with a flat base plate 32. Release arm 24 maintains plate 32 is an inclined plane with respect to a top surface of support element 14. Right and left guide plates 30 and 31 deflect inwardly towards the towing vehicle. Base plate 32 is rotatably mounted on bracket 34 by bolt 35 to the support element 14 at an end distant from the hitch bracket 12. Plate 32 has centrally mounted thereon a pair of pivoting release doors 36. Each release door 36 is mounted by bolt 37 to a bracket 39 attached to the bottom 41 of plate 32.

The towed vehicle or trailer has a tow bar 38 attached to the frame of the trailer on which is bolted a second hitch or roller assembly 40. Bolt 42 is held in place by nuts 44. The portion of the trailer tow bar 38 distal from the trailer contains the ball socket 46. The roller assembly mounted over ball socket 46, has an upright frame 48 on which is mounted four roller bearings 50. These roller bearings 50 are mounted on the front surface 49 of the hitch assembly 40 so that two are in an inclined upright position and two are in an inclined downward position.

Figure 6:
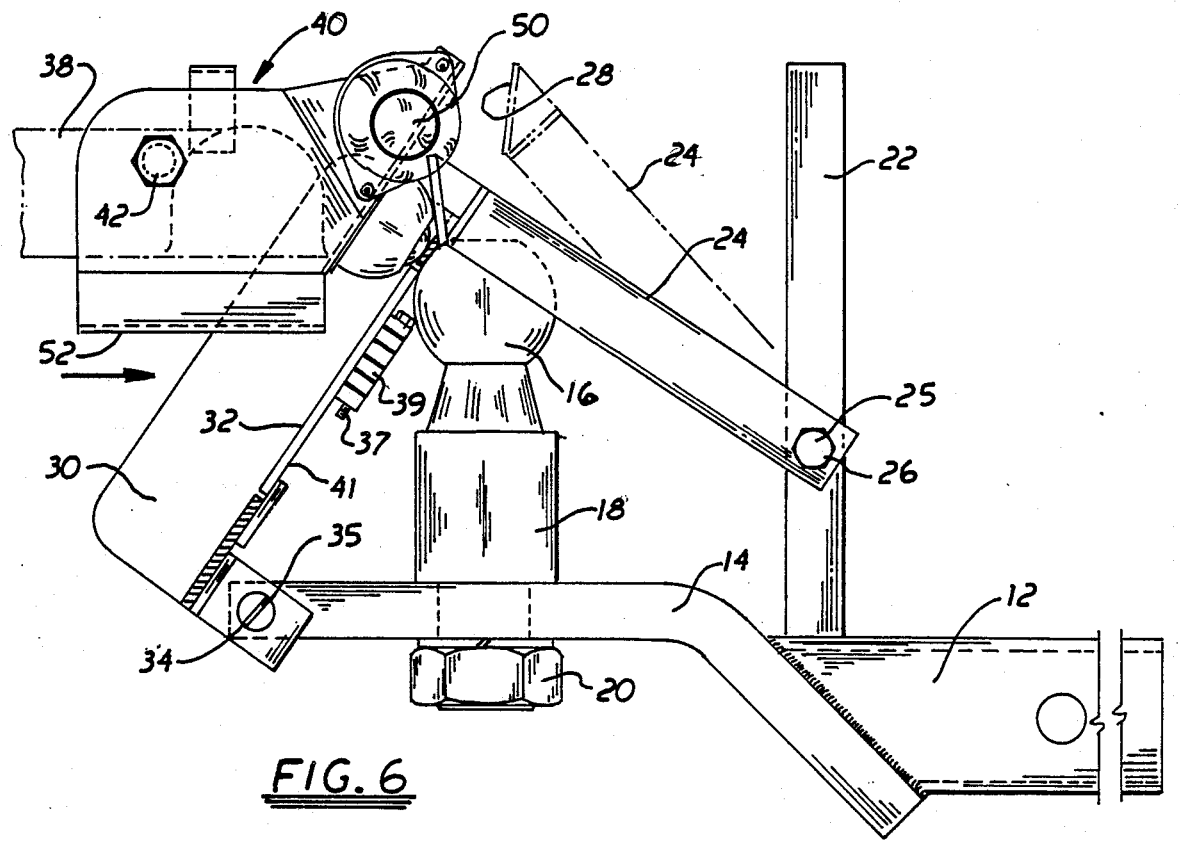
FIG. 6 is a side view in elevation partially in phantom showing engagement of the trailer attachment of FIG. 3 with the motor vehicle portion of the hitch.

Referring to FIG. 6, during engagement of the first 10 and second 40 hitch assembly the trailer remains in a fixed position with its hitch roller assembly 40 stationary on the trailer tow bar 38. The towing vehicle backs towards the roller assembly 40 so that the rollers 50 are struck by plate 32. As the rollers 50 move up the inclined plane of plate 32, they are maintained from deviating either to the right or to the left by guide plates 30 and 31. Any deviation is corrected by the guide plates inclined inwardly towards the towing vehicle. As the towing vehicle moves closer to the roller assembly, the roller assembly 40 is struck by edge 28 of the release arm 24 causing the release arm 24 to disengage from plate 32 and allow plate 32 to fall downwardly. As plate 32 moves downwardly the pair of pivoting release plates 36 centered in plate 32 open and allow the plate 32 to fall further down over the ball 16 and eventually rest with its bottom 41 parallel to support element 14. Meanwhile, the trailer roller assembly 40, on plate 32, is positioned so that socket 46 is directly above ball 16. The entire roller assembly 40 then falls by gravity over ball 16. Roller assembly 40 is restricted in moving past the vehicle assembly 10 by virtue of the engagement of socket 46 with ball 16.

Figure 7:
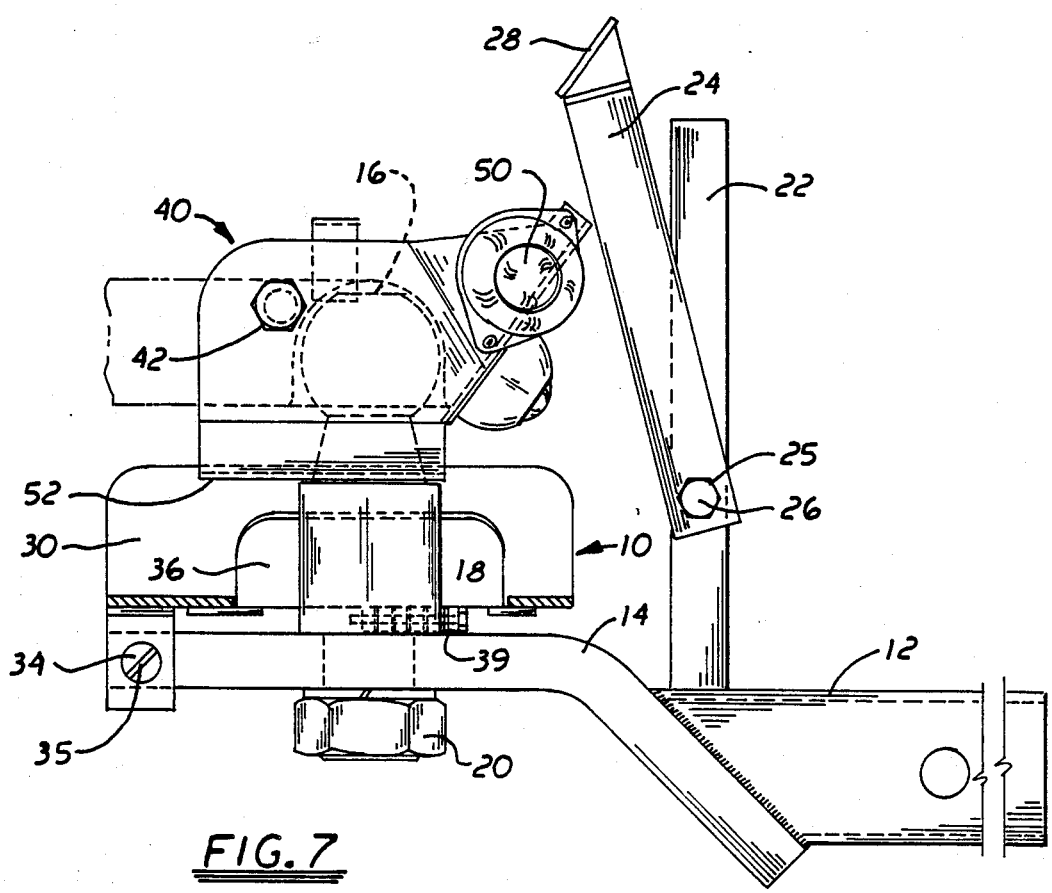
FIG. 7 is a side view in elevation partially in phantom showing the joined trailer attachment and motor vehicle portions of the hitch.

The completely engaged position is seen in FIG. 7 where the release arm 24 is now kept in an upright position by the front edge of the roller assembly 40 and the socket 46 is now fully engaged over the ball 16 so that trailering can begin.

Figure 14:
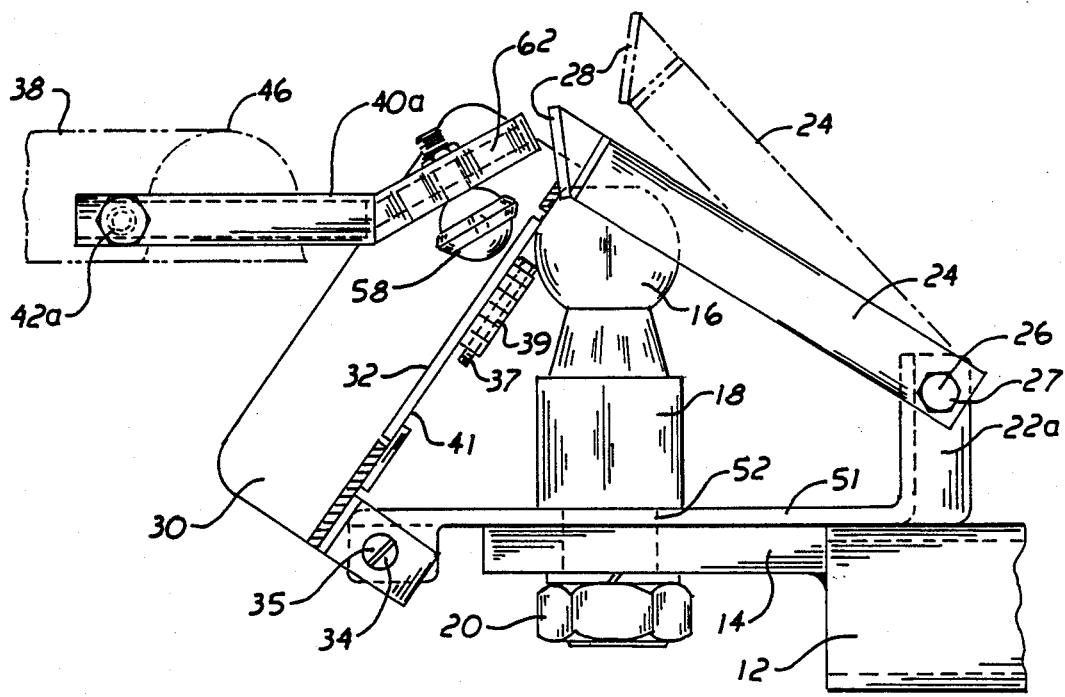
FIG. 14 is a right side view in elevation of the alternate trailer hitch engaging the vehicle portion of the hitch.

A ball mounting plate 51 having a hole 52 for receiving a ball mount can be bolted to pivot points 34 and 26 respectively as seen in FIG. 14. Hole 27 is used to bolt the mounting plate 51 to the release arm 24. Hole 33 is used to bolt plate 51 to hitch assembly 10. Nut 20 at the bottom of the ball mount attaches plate 51 to support element 14. Ball mounting plate 51 removes the need for a separate post 22 since U-shaped projection 22a supports the release arm 24.

Figure 8:
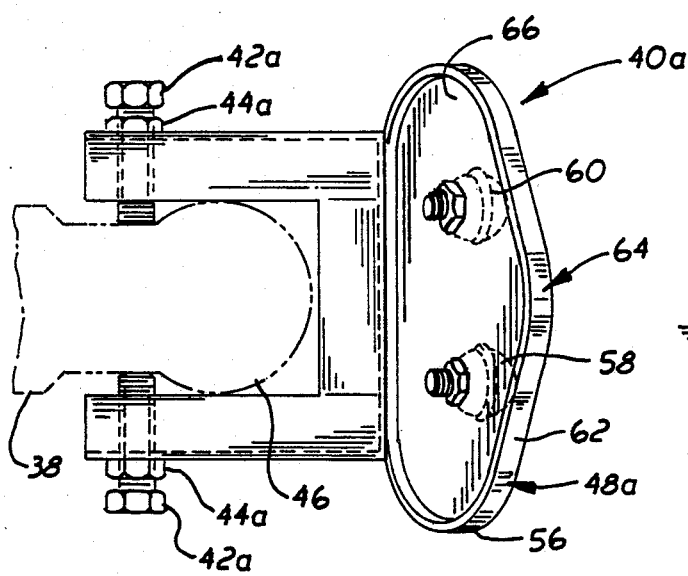
FIG. 8 is a top plan view of an alternate embodiment of the trailer attachment prior to engagement with the vehicle portion of the hitch.
Figure 9:
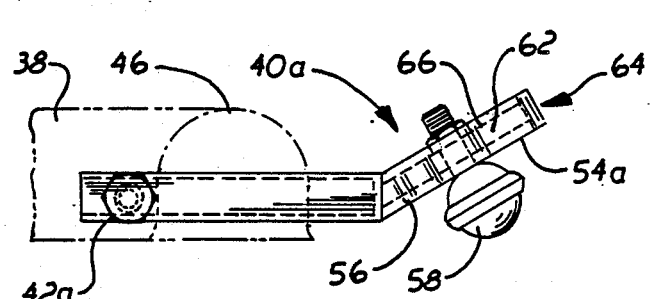
FIG. 9 is a right side elevation of the alternate trailer attachment.
Figure 10:
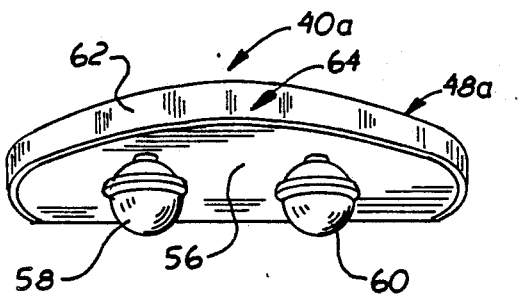
FIG. 10 is a front elevation view of the alternate trailer attachment.

An alternate roller assembly 40a seen in FIGS. 8 through 10 can be mounted to a trailer tow bar 38 having a ball socket 46 at its distal end in the same manner as the roller assembly 40, heretofore described. Bolt 42a and nut 44a is used to mount the housing 48a on the tow bar 38. The housing 48a has a lower edge 54a and an upper edge 62. The forward portion 64 of the roller assembly 40a has a depression on each side of the edge 62. As the hitch plate 32 is backed toward the roller assembly 40a, forward rollers 58 and 60, mounted on the front plate 56 and bolted to back surface 66, first engage plate surface 32. Edge 62 will strike guide plates 30 and 31 and be deflected from the side and towards the center of plate 32. As edge 62 strikes the front edge 28 of the release arm 24, the assembly 10 falls by gravity and the pair of pivoting release doors 36 open over the ball 16. This causes the plate 32 to fall down over ball 16 and allows frame 40a to approach the leading edge 68 of the side plates 30 and 31. At this point, the towed vehicle hitch assembly cannot move back any further and the socket 46 will be above the ball 16. It will fall by gravity onto the ball 16 to thus engage and place the trailer in a position of being towed.

Figure 11:
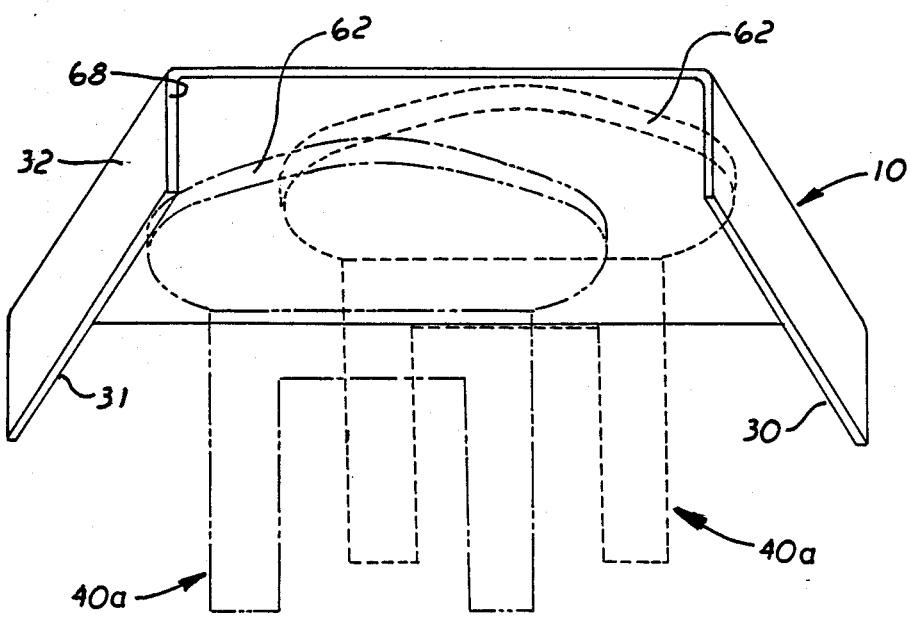
FIG. 11 is a top plan diagrammatic view of the trailer hitch engaging the vehicle portion of the hitch.
Figure 13:
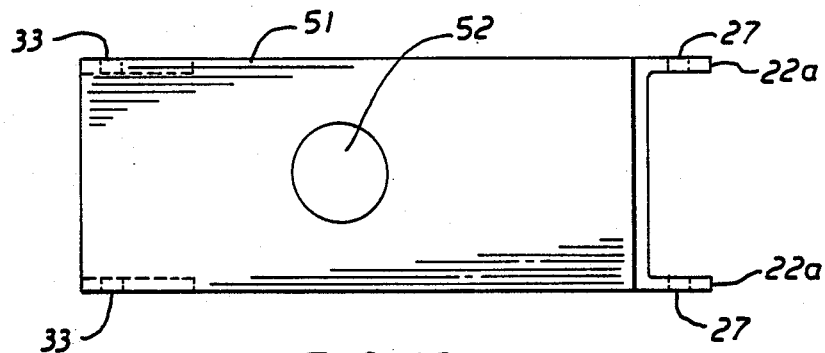
FIG. 13 is a top plan view of the ball mounting plate.
Figure 12:
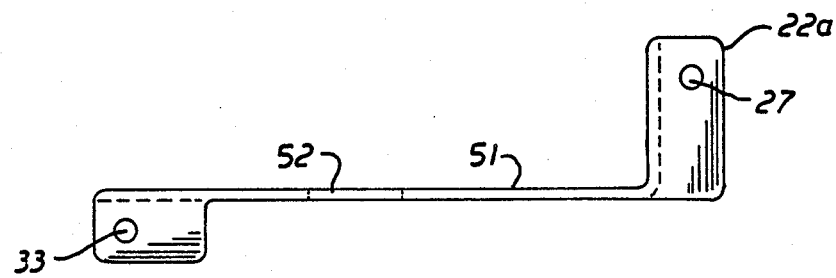
FIG. 12 is a side elevation view of a ball mounting plate.

The deflection angle of the frame 40a within the assembly 10 can be seen in FIG. 11. This invention provides a wide area of correction as a towing vehicle is backed towards a trailer hitch assembly.

Equivalent devices can be substituted for the elements of this invention in order to achieve the equivalent results.

Having thus described the invention, what is claimed and desired to be secured by Letters Patent is:

1. In a self aligning trailer hitch assembly for use with a towing vehicle having a ball member mounted on a rear end of the towing vehicle and a frame device having a ball socket mounted on a tongue of a towed trailer, the improvement comprising:
    (a) a first hitch assembly frame pivotally mounted on a hitch bracket extending laterally from the rear of the towing vehicle, the first hitch assembly having a back plate vertically mounted over the hitch bracket, a release arm pivotally mounted at a first end to the back plate and at a second end holding a front edge of a flat plate having side guide plates integral thereto, in an upward inclined position, the flat plate having a pair of pivoting release doors between the guide plates,
    (b) a second hitch assembly frame mounted over a ball socket located at a distal end of a trailer tongue, the second hitch assembly frame having multiple rolling members on a front surface engaging the flat plate and the guide plates upon moving the towing vehicle and its first hitch assembly to engage the second hitch assembly,
    (c) the second hitch assembly frame engaging and tripping the second end of the release arm to allow the flat plate to fall over the ball and actuate the pair of pivoting release doors so that the ball protrudes through the release doors and allows the socket to fall by gravity over the ball to engage the trailer to the towed vehicle.

2. A trailer assembly according to claim 1 wherein the rolling members on the second hitch assembly front edge are ball bearings.

3. A trailer assembly according to claim 2 wherein there are four ball bearings on the second hitch assembly front surface.

4. A trailer assembly according to claim 2 wherein there are two ball bearings on the second hitch assembly front surface.

5. A trailer assembly according to claim 1 wherein the back plate is integral with a flat plate parallel to the hitch bracket and the plate having a hole to accommodate the ball.

6. A trailer assembly according to claim 5 wherein two roller members are located on the front surface and are deflected downwardly.

7. A self aligning trailer hitch assembly for use with a towing vehicle having a ball member mounted on a rear end of the towing vehicle and a frame device containing a ball socket mounted on a tongue of a towed trailer comprising;
    (a) a first hitch assembly mounted on a rearwardly extending bracket containing the ball member, the bracket welded or bolted to the towing vehicle, the first hitch assembly having a vertically mounted post on the bracket forward of the ball member, a release arm pivotally mounted at a first end to the post and at a second end holding in an inclined position a front edge of a frame containing a flat bottom plate and two side plates inclined towards the post, the bottom plate having a pair of pivoting trap doors, (b) a second hitch assembly frame mounted over a ball socket located at a distal end of a trailer tongue, the second hitch assembly having one or more rolling members mounted on the front portion of the frame, (c) the second hitch assembly rolling members moving over the bottom plate and against the side plates of the first hitch assembly upon engagement of the two assemblies, (d) the second hitch assembly tripping the second end of the release arm to permit engagement of the socket and the ball.

* * * * *